United States Patent [19]

Large

[11] Patent Number: 4,577,450
[45] Date of Patent: Mar. 25, 1986

[54] WATERPROOF FLOOR PANEL FASTENING SYSTEM, ACCESSIBLE FROM ABOVE

[75] Inventor: David T. Large, Everett, Wash.

[73] Assignee: The Boeing Company, Seattle, Wash.

[21] Appl. No.: 515,712

[22] PCT Filed: Jun. 6, 1983

[86] PCT No.: PCT/US83/00889

§ 371 Date: Jun. 6, 1983

§ 102(e) Date: Jun. 6, 1983

[87] PCT Pub. No.: WO84/04948

PCT Pub. Date: Dec. 20, 1984

[51] Int. Cl.⁴ .................................................. E04C 5/16
[52] U.S. Cl. ............................................. 52/787; 52/704
[58] Field of Search ................................. 52/787, 704

[56] References Cited

U.S. PATENT DOCUMENTS

| | | | |
|---|---|---|---|
| 2,140,709 | 12/1938 | Mauser | 189/34 |
| 2,585,557 | 2/1952 | Kreimendahl | 189/34 |
| 2,607,447 | 8/1952 | Tuttle | 189/34 |
| 2,957,196 | 10/1960 | Kreider et al. | 16/2 |
| 2,961,760 | 11/1960 | Horton et al. | 29/455 |
| 2,967,593 | 1/1961 | Cushman | 189/34 |
| 3,008,552 | 11/1961 | Cushman et al. | 189/34 |
| 3,017,673 | 1/1962 | Biris, Jr. | 20/6 |
| 3,137,887 | 6/1964 | Mannino et al. | 16/2 |
| 3,197,854 | 8/1965 | Rohe et al. | 29/455 |
| 3,510,916 | 5/1970 | Phelan | |
| 3,526,072 | 9/1970 | Campbell | 52/617 |
| 3,579,942 | 5/1971 | Cole | 52/615 |
| 3,662,805 | 5/1972 | Sygnator | 151/41.73 |
| 3,716,092 | 2/1973 | Serewicz | 151/41.75 |
| 3,742,673 | 7/1973 | Jennings et al. | 52/624 |
| 3,771,272 | 11/1973 | Mihaly et al. | 52/617 |
| 3,815,300 | 6/1974 | Bain | 52/73 |
| 3,884,006 | 5/1975 | Dietlein | 52/617 |
| 3,892,099 | 7/1975 | Worgan et al. | 52/479 |
| 3,977,146 | 8/1976 | Wiley | 52/617 |
| 4,056,878 | 11/1977 | Woodley | 29/526 R |
| 4,296,586 | 10/1981 | Heurteux | 52/787 |
| 4,341,053 | 7/1982 | Dettfurth et al. | 52/787 |

*Primary Examiner*—Carl D. Friedman
*Attorney, Agent, or Firm*—Eugene O. Heberer

[57] ABSTRACT

A waterproof floor panel (10) fastening system, accessible from above in which floor panels (10) have spaced upper and lower plates (12, 14), the panels being waterproof and being secured on support structure (74) thereunder. There are fastening assemblies securing the panels to the support structure and extending into openings through the upper and lower plates (12, 14) and supporting honeycomb (16) therebetween. Each assembly has an upwardly opening first cup (48), having a central hole (52) in its bottom and having a fastening bolt (60) extending therethrough. An upper second cup (100) is fitted in the opening of the first cup, the second cup or cap having a central portion forming a transverse wall or web (98), spaced above the bolt head. A hardened seal (96) extends across and above the transverse wall or web of the upper cup and forms a seal across the opening of the upwardly open first cup (48).

31 Claims, 16 Drawing Figures

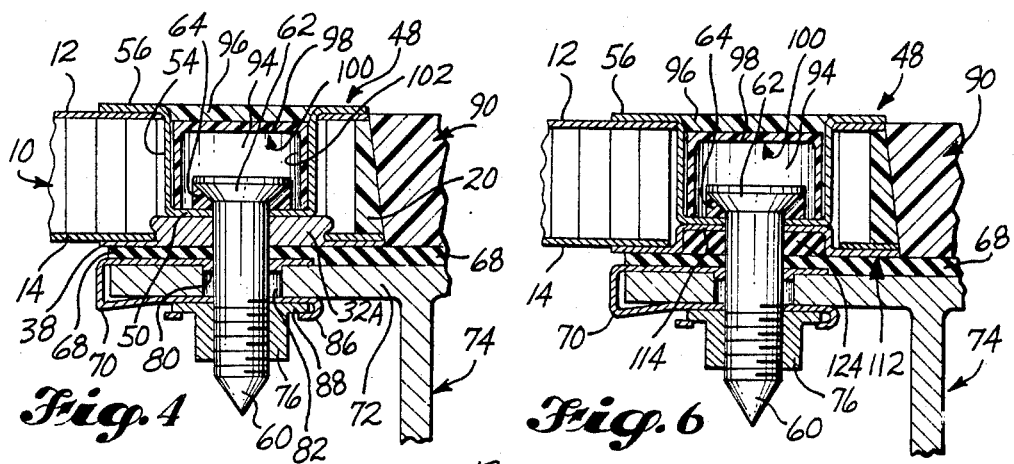
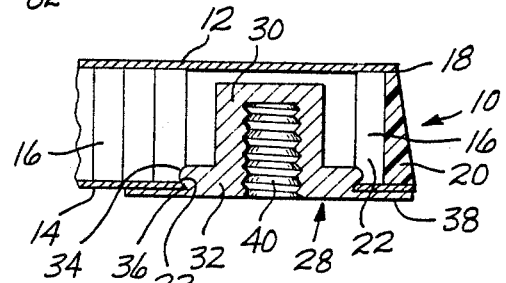
Fig. 1 PRIOR ART
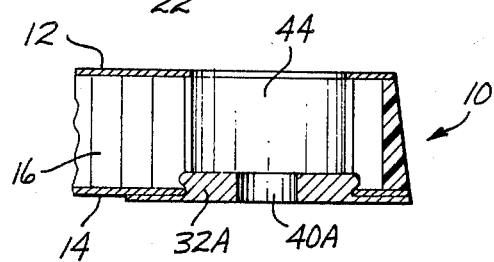
Fig. 2 PRIOR ART
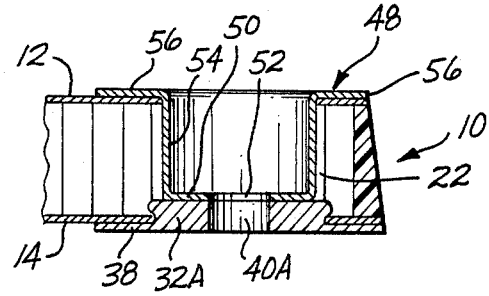
Fig. 3
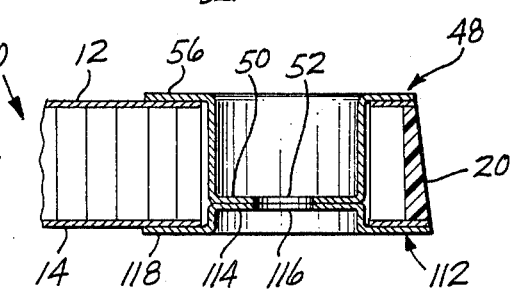
Fig. 5

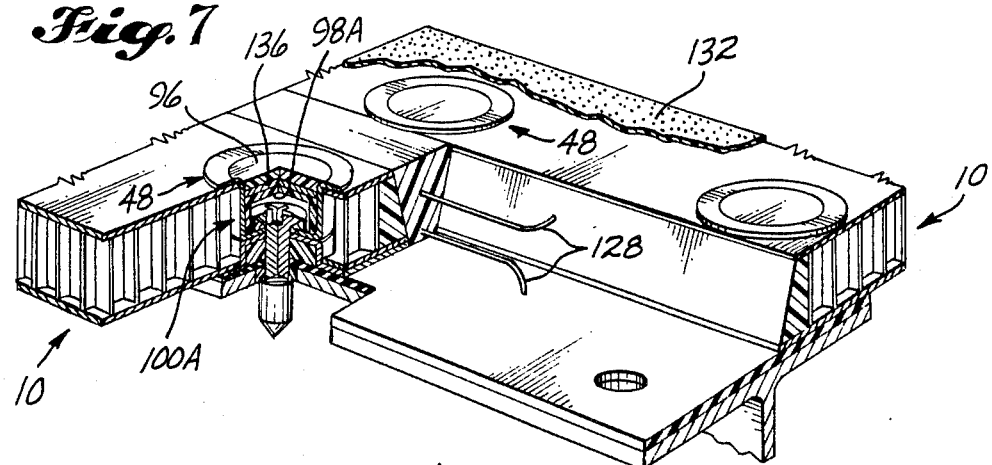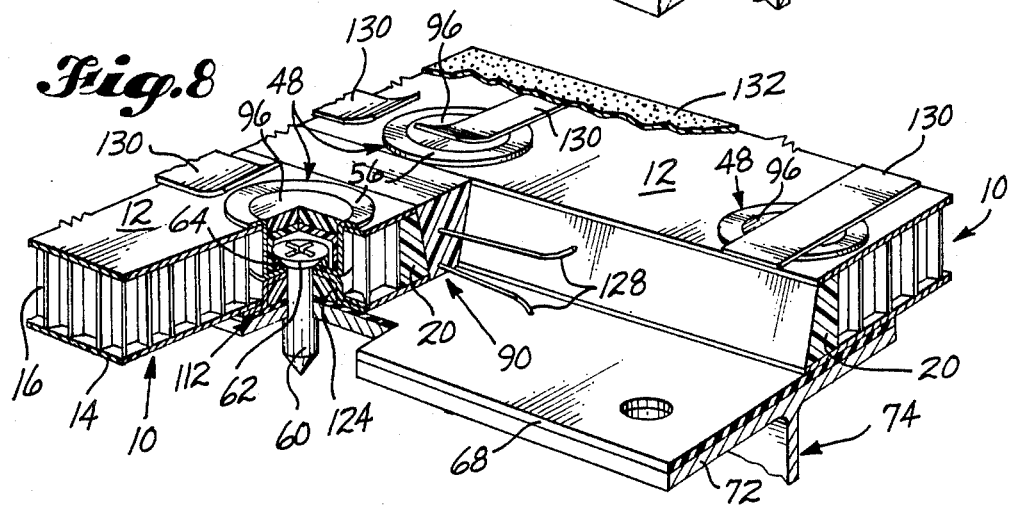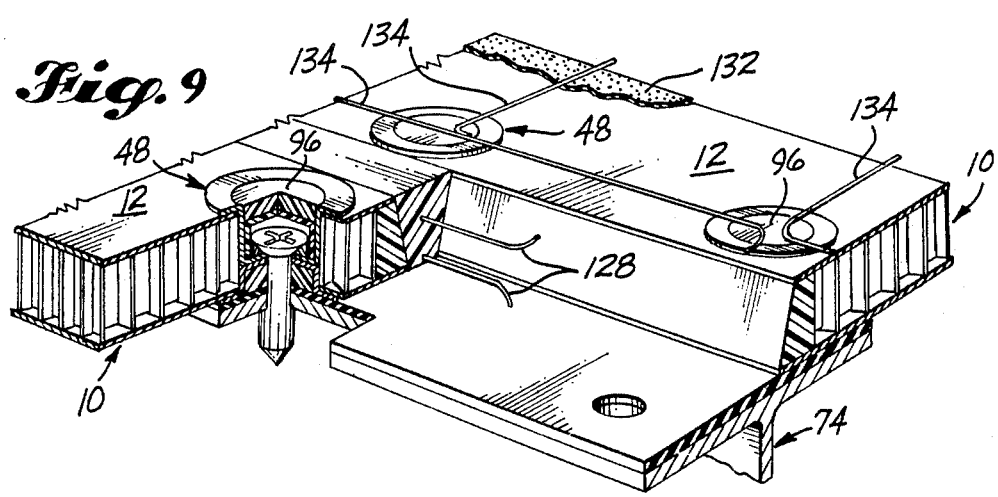

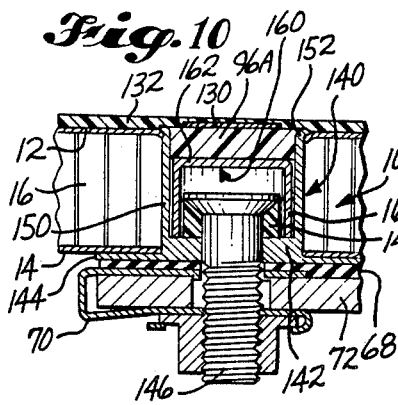
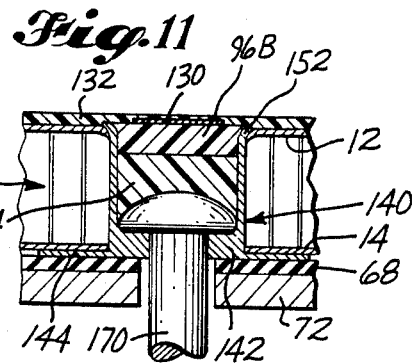
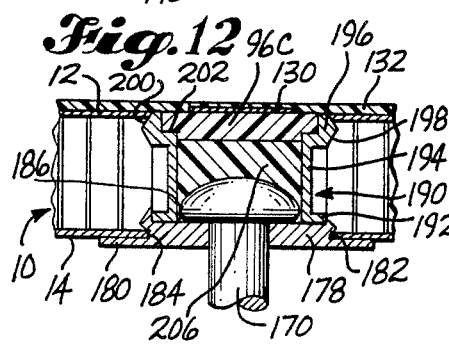
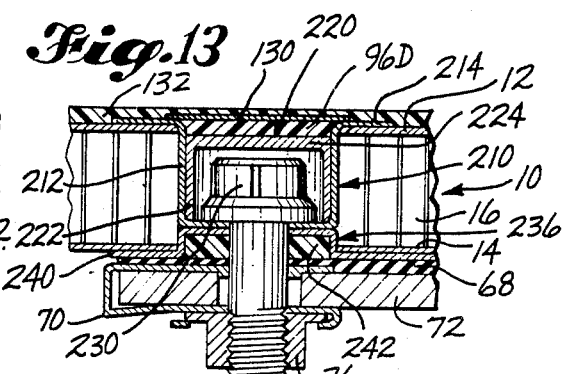
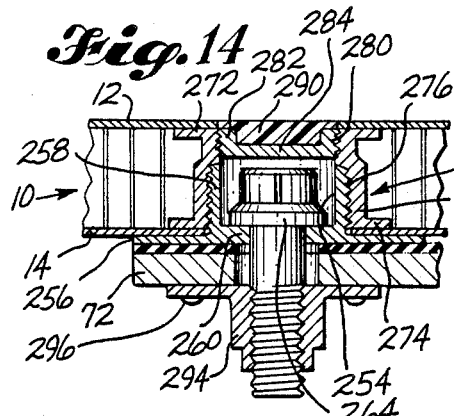
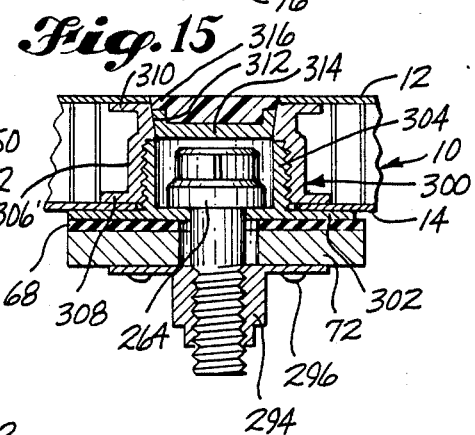
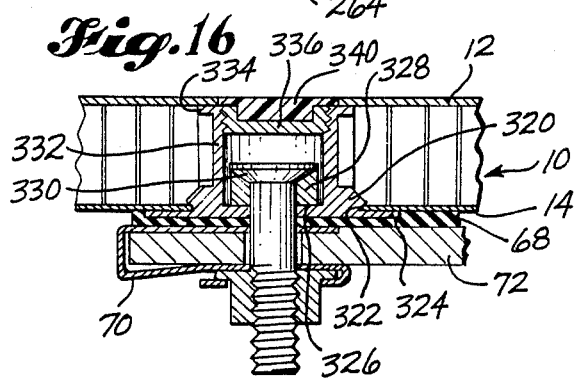

WATERPROOF FLOOR PANEL FASTENING SYSTEM, ACCESSIBLE FROM ABOVE

DESCRIPTION

1. Technical Field

The invention relates to floor fastening systems providing waterproof joints for use around entry doors and galleys in aircraft and which allow floor panel fastener access and panel removal from above the floor.

2. Background Art

Prior attempts to fasten floor panels in aircraft galley and entry areas so as to provide both ready access and waterproofing have compromised one or the other. Some present designs in passenger aircraft require bolting access from below the floor. For many aircraft this approach is inadequate due to equipment blockages under the floor.

In some previous models, floor panels were bolted in from above, and floor areas subject to moisture were vinyl covered. Because of the use of a substructure gasket, which allows lateral panel float under loads, these panels deflect under walking pressure, forcing the fastener heads up into the cover. Resulting cracks from the heads, being forced into the cover, eventually cause water leaks and corrosion of the substructure.

A search of the patent literature discloses a number of systems for securing panels to an aircraft floor.

One approach is illustrated in U.S. Pat. No. 3,892,099. This shows a tubular insert in the panel floor. The insert has an internal flange bonded to an innerface of a lower skin of a honeycomb panel and the insert has an external flange, bonded to the outerface of the upper skin of the panel. The invention uses a second insert 26, surrounding the said tubular insert 12. The invention also includes a plug 28 used in the tubular insert to provide a flush upper surface, the plug being in contact with a bolt head 20. When the bolt is to be released, the plug is removed with a pointed tool.

The following patents disclose systems somewhat related to that described above:

U.S. Pat. No. 2,140,709, granted Dec. 20, 1938, to K. W. Mauser;
U.S. Pat. No. 2,585,557, granted Feb. 12, 1952, to R. Kreimendahl;
U.S. Pat. No. 2,607,447, granted Aug. 19, 1952, to O. S. Tuttle;
U.S. Pat. No. 2,957,196, granted Oct. 25, 1960, to D. B. Kreider et al;
U.S. Pat. No. 2,961,760, granted Nov. 29, 1960, to R. E. Horton et al;
U.S. Pat. No. 2,967,593, granted Jan. 10, 1961, to K. V. Cushman;
U.S. Pat. No. 3,008,552, granted Nov. 14, 1961, to K. V. Cushman et al;
U.S. Pat. No. 3,017,673, granted Jan. 23, 1962, to J. Biris, Jr.;
U.S. Pat. No. 3,137,887, granted June 23, 1964, to A. J. Mannino et al;
U.S. Pat. No. 3,197,854, granted Aug. 3, 1965, to F. W. Rohe et al;
U.S. Pat. No. 3,526,072, granted Sept. 1, 1970, to J. R. Campbell;
U.S. Pat. No. 3,579,942, granted May 25, 1971, to J. M. Cole;
U.S. Pat. No. 3,662,805, granted May 16, 1972, to H. A. Sygnator;
U.S. Pat. No. 3,716,092, granted Feb. 13, 1973, to A. J. Serewicz;
U.S. Pat. No. 3,742,673, granted July 3, 1973, to Jennings et al;
U.S. Pat. No. 3,771,272, granted Nov. 13, 1973, to Mihaly et al;
U.S. Pat. No. 3,815,300, granted June 11, 1974, to B. R. Bain;
U.S. Pat. No. 3,884,006, granted May 20, 1975, to R. W. Dietlein;
U.S. Pat. No. 3,977,146, granted Aug. 31, 1976, to T. W. Wiley;
U.S. Pat. No. 4,056,878, granted Nov. 8, 1977, to G. E. Woodley;
U.S. Pat. No. 4,296,586, granted Oct. 27, 1981, to B. M. Heurteux; and
U.S. Pat. No. 4,341,053, granted July 27, 1982, to Dettfurth et al.

DISCLOSURE OF THE INVENTION

The invention is a floor panel fastening system, including inventive fasteners, for use in aircraft around entry doors and galleys which allows floor panel fastener access amd panel removal from above the floor. It includes bonded-in inserts for composite honeycomb floor panels, for example, allowing fastening through the panel from above, a silicone rubber hardened seal, for example, to waterproof each fastener above a bolt head, seals along the bolt shank, and float-clearance within the panel between the bolt head and the hardened seal.

The invention includes fastener assemblies for floor panel removal and inspection from above, wherein the assemblies include an upwardly open first tubular cup, the first cup having a central hole and in its bottom and having a fastening bolt extending therethrough. There is an upper second tubular cap or cup fitted in the opening of the upwardly open first cup, the second cup having a central portion forming a wall transverse to the bolt axis and spaced above the bolt head. A hardened seal extends across and above the transverse wall of the upper cup and forms a seal across the opening of the upwardly opened first cup. The hardened seal is typically silicon rubber which in the absence of oxygen is liquid and when applied to the transverse wall from a tube, for example, hardens in the air to form a permanent seal. The second cup has its opening extending downwardly within the first cup and is supported on the bottom of the first cup. The cups are typically non-magnetic, nylon, composites, or other plastics, for example, and a magnetic disk may be positioned between the transverse wall and the seal so that the fastening assembly can be found when covered by a finished floor with the use of a magnetic stud-finder.

In another embodiment the second cup opens upwardly and the transverse wall forms the bottom thereof. In this embodiment the seal fills the second cup and extends over its opening to form a seal with the first cup.

The first cup may have a flange extending radially outwardly from its upper end and from the seal, and the flange may be positioned within an upper plate of a composite panel or may be positioned outwardly of the upper plate. In either case it is bonded to the upper plate which is typically a composite material made, for example, from an epoxy resin reinforced with graphite or glass fibers. In this type of panel the lower plate is of the same material and they are spaced by honeycombs having their longitudinal members perpendicular to the upper and lower plates. The honeycombs may be typically made from cardboard or some other stiff paper product.

In other embodiments there are third tubular caps or cups or generally cylindrical members which support the first cups and which have flanges extending radially along the lower plates of the panel, either inwardly or outwardly thereof and bonded thereto.

In each situation there is a float space above the bolt head between the transverse wall of the second cup and the seal. In some embodiments a low density sealant or foam is positioned between the bolt head and a hardened high density seal extending across the low density sealant to form a seal at the upper end of a cup-shaped tubular member through which the bolt extends. In these situations there is no second cup providing a transverse wall under the hardened high density seal.

The invention also includes a waterproof floor panel fastening system, accessible from above, in which the floor panels have upper and lower spaced graphite or glass reinforced composite plates, supported by honeycomb structure therebetween. The panels are waterproof and are secured on support structure thereunder. The fastening assemblies securing the panels to the support structure extend into openings through the upper and lower plates. Each fastening assembly may be of one of the types described in the foregoing.

In addition the invention includes means for modifying prior fastening assemblies, accessible from below the panels, into assembly structures accessible from above the panels.

The present invention permits the use of a fastener insert that is substantially less expensive than the inserts required for access from below the panels. The new insert costs 9¢ each versus 22¢ for the prior insert. Thus, there is a savings of 13¢ per insert, and for 1020 inserts per airplane and for 175 airplanes, the total savings for inserts would be $23,205.

The new installation costs and replacements are also substantially less expensive than the prior art type of fasteners. It is considered that the man hour savings on 175 airplanes will be 3,440 man hours times $33.70 per hour which equals $115,928. Thus, the reduced costs for inserts and installation in 175 airplanes equals $139,133.

The present invention fits the existing hole pattern in the present floor panels, permits use of the present proven sealing method between panels, can be applied to existing panels by means of rework, and would meet customer requirements.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 1 is a cross-sectional view of an insert in which the fastening assembly is adapted to be accessible from below the panels;

FIG. 2 is a view similar to that in FIG. 1 illustrating steps in the conversion of the accessible-from-below system to the inventive accessible-from-above system;

FIG. 3 is a cross-sectional view showing the structure as it is being developed to be similar to that shown in FIG. 4;

FIG. 4 is a side elevational cross-sectional view of a fastening assembly, according to the invention, as may be made from a preexisting fastening assembly accessible from below the panels;

FIG. 5 is a cross-sectional view of inserts in the fastening assembly from above;

FIG. 6 is a side elevational cross-sectional view of a fastening assembly illustrating an embodiment of the invention employed in a new structure, as distinct from that shown in FIG. 4.;

FIG. 7 is a fragmentary isometric view of a floor fastener and panel assembly illustrating the employment of a magnetic disk below the seal, and a seal between panels in which piano wire strippers are buried to facilitate panel removal;

FIG. 8 is a view similar to that in FIG. 7 illustrating the use of fiber-strengthened vinyl covered tapes positioned to extend over rows of fastener assemblies and buried below a surface finish, the tape being adapted to be peeled-off to expose hidden fastener assemblies for removal and inspection;

FIG. 9 is a view similar to FIGS. 7 and 8 in which piano wires buried beneath a surface finish to extend above each row of fastener assemblies and in which the piano wires are adapted to be stripped-off the surface finish to reveal the location of hidden fasteners;

FIG. 10 is a fragmentary cross-sectional view of an embodiment of a fastener assembly having an upwardly opening tubular cup and a downwardly opening upper tubular cup or cap below a seal and providing a substantial space between a fastener head and the internal bottom of the upper cup;

FIG. 11 is a view similar to that in FIG. 10 having an upwardly opening cup, filled with a low density sealant above and between a fastener head and a hardened high density seal;

FIG. 12 is a view of another embodiment of the invention in which a generally cylindrical member is fitted at the bottom of the panel, similar to that in FIG. 2, and above which is a tubular insert, filled with a low density seal above a fastener head, the low density seal supporting a hardened high density seal extending across the top of the tubular member;

FIG. 13 is a cross-sectional view similar to FIG. 6 and in which the fastener head is of the socket wrench-type that fits directly on the bottom of the upwardly opening tubular cup;

FIG. 14 is a cross-sectional view in which there is a lower insert having an external flange with respect to the bottom plate and forming an upwardly opening cup, a sleeve-type insert internally of the panel and threadedly engaged with the lower insert, and an upper insert forming an upper cup threadedly engaged with the sleeve insert;

FIG. 15 is a view of an embodiment similar to that shown in FIG. 14 and having an upper cup which is hand-pressed into the sleeve rather than threadedly engaged as in FIG. 14; and FIG. 16 is a view of still another embodiment of the invention in which a lower cup forming insert is engaged with the lower plate of the panel both internally and externally, and in which the upper cup carrying the seal is threadedly engaged in the lower insert.

BEST MODE FOR CARRYING OUT THE INVENTION

Referring again to the drawings, there is shown in FIGS. 1–4 the structural steps for reworking a panel securable by a fastener accessible from thereunder, to subfloor frame structure. In FIG. 1, a honeycomb floor panel, generally designated as 10, has an upper plate 12 and a lower plate 14. These plates may be typical composite structures formed from an epoxy resin and reinforced with graphite or glass fibers woven into cloth form. Spaced at right angles between the plates 12 and 14 is a honeycomb 16 formed of stiff paper having sufficient strength to support a walking load on the panels. The panel plates and honeycomb 16 may also be made of lightweight metal.

Where a panel terminates internally as at 18, the honeycomb is filled with an edge filler 20 formed of a lightweight plastic, such as plastic foam. This prevents moisture accumulation and provides a solid edge surface for sealing.

In the prior art to secure the panel from the underside, an insert 28 is positioned within the panel after a cylindrical recess is cut as at 22. The cylindrical hole 22 penetrates enough into the panel core 16 to accommodate insert 28, yet leave sufficient core intact to support upper plate 12 above the fastener. Insert 28 is made of forged aluminum and has an upper cylindrical portion 30, a lower large diameter retainer portion 32 having an annular convex edge 34 and an annular groove or recessed portion 36 with a radial flange 38 extending outwardly from its bottom.

The bottom plate 14 is resilient so inserts 28 can be snapped into place, each with inner circular edge 22 of plate 14 fitting into groove 36. Flange 38 is bonded to the external surface of plate 14. An internal thread 40 is adapted to receive a fastener stud which would protrude through substructure and along with other fasteners accept a nut to secure the panel in place on substructure.

FIGS. 2 and 3 illustrate the modification of the insert structure in FIG. 1 so that the fastener can be accessible from above. A hole 44 is formed by drilling through the plate 12. The upper portion 30 of insert 28 is either drilled away in place or cut off by removing the insert from the panel. What remains of the threaded hole 40 in the portion 32A is enlarged into a cylindrical hole 40A. An upwardly opening first tubular cup or cap member 48 is then inserted into the opening 44. The insert 48 has its bottom 50 bonded to the cylindrical portion 32A and has a central opening 52 which matches and adjoins opening 40A. The insert 48 has a cylindrical sidewall 54 and at its upper end has a radially directed flange 56, bonded to the upper plate 12. Insert 32A is bonded to the bottom 50 so as to form a sealed unit from the top of the panel to the bottom except through the central openings 52 and 40A. The structure in FIG. 3 thus provides a completed reworked panel opening and inserts for converting the panel from one in which the fastener is accessible from below to one in which the fastener is accessible from above as shown in FIG. 4.

In FIG. 4 a bolt 60 having a Phillips head 62, supported on a conical surface of a nylon washer 64 extends through the openings 52 and 40A, through a float gasket 68, a clip 70, a flange 72 of a substructure support 74 and through a clip nut 76. A countersunk bolt 60 is employed here with washer 64 for standardization reasons, to utilize the same bolt that is used to fasten floor panels elsewhere on the airplane where there are no moisture problems, the floor being covered by a rug.

The substructure gasket 68 is required to allow lateral panel float under loads and during aircraft body pressurization. The substructure gasket 68 on previous floor panels, which were bolted from above, allowed the panels to deflect under walking pressure so as to force the fastener heads up into the vinyl floor cover. This resulted in cracks that eventually caused water leaks and corrosion in the substructure. It was because of this problem that bolts were made accessible from below but which are not possible for use in certain aircraft locations because of substructure interference.

The nut clip 70 holds the nut in place for tightening from above. As seen in FIG. 4 the clip is substantially U-shaped in side view and has a top central opening, the opening edges being formed into an annular positioning flange 80 extending into opening 82 in the substructure flange 72. The lower part of the clip has an opening through which the bolt extends and has a portion 86, shown in part, which holds a flange 88 on the upper end of the nut. This type of clip prevents rotation of the nut when the bolt is being tightened from above.

One panel is sealed to another horizontally above substructure 74 and the gasket 68 by a V-shaped hardened seal 90. The seal 90 is typically of silicon rubber which is liquid in a sealed container and which hardens when exposed to the air and seals against each panel on the edge filler 20.

According to the invention, float space 94 is provided above the nut head between an upper hardened seal 96 and the bolthead 62. Clearance 94 permits upward movement of the bolt relative to the seal 96 without damage to the seal. Seal 96 is also a hardened seal like seal 90 and is formed along the floor level between the upper opening of the tubular cup 48 and its flange 56. The seal 96 is supported on a transverse web or bottom wall 98 of a tubular inverted second cup or cap 100, having a cylindrical wall 102 with its lower edge or end supported on bottom 50 of cup member 48. The inverted cup 100 is typically nylon or other hard plastic but may be made of a lightweight metal. After the seals 96 in the various fasteners are hardened the finish floor surface may be applied to the upper side of the panel to cover the plates 12, the seals 96, the flanges 56, and the facings seals 90 between the panels. Each seal 96 waterproofs a fastener in conjunction with the fastener inserts bonded permanently within the panel.

In FIGS. 5 and 6 an embodiment of the invention is shown in which the fastener, accessible from above, is incorporated in a panel which has not had a previous fastener therein. A hole is drilled through the panel and an upwardly open first cup 48 is inserted into the opening and is bonded to the upper plate 12. At the lower end a downwardly opening tubular third cup 112 has a bottom wall 114 with an opening 116 therein, and has an outwardly extending radial flange 118. The bottom 114 is bonded to the wall 50 with the openings 52 and 116 in register and the flange 118 is bonded to the bottom plate 14.

As shown in FIG. 6 this arrangement provides for an additional or optional secondary sealing gasket 124 fitted within the tubular portion of the cup 112 and in sealing relationship with the bolt extending therethrough as well as in sealing relationship with the gasket 68. Above the bottom 50 in cup 48 the structure is the same as shown in FIG. 4, having the inverted tubular second cup 100 and its lower cylindrical end supported on the bottom 50. The seal 96 extends across the transverse wall or web bottom 98 to form a seal above cup 48 with the inner surface of the flange 56.

In FIG. 8, the arrangement of a series of panels 10 secured to aircraft substructure 74 is illustrated. The seals 96 and 124 and the inserts therearound and therebetween, and the bolt 60 are identical to those shown in FIG. 6. The general arrangement of fasteners as 60 is in rows as indicated by the inserts 48 and the opening in the gasket 68.

Piano wire seal-strippers are buried in hardened panel seal 90 to facilitate the removal of panels as necessary. Each pair of panels has a seal 90 therebetween including the seal-strippers which are made available for gripping adjacent the end of the panels, not shown. Strips of fiber-strengthened vinyl cover tape 130 are extended over rows of fasteners intersecting one another and are buried beneath a gritted plastic surface finish 132 which extends over the entire floor. The vinyl tapes extend across the panels, seal-to-seal. The ends are exposed out of sight near the ends of the panels so they can be grasped for stripping when panel edge seals, not shown, are removed. The tape is lifted to peel away the gritted surface finish and expose the hidden fasteners thereunder so the fasteners can be removed or repaired as necessary.

The structure in FIG. 9 is the same as in FIG. 8 except instead of the vinyl tapes 130, piano wires 134 are buried beneath the gritted surface finish 132 above each row of fasteners. The piano wires are located by using magnetic stub-finders and/or knife probes when panel removal is required. The piano wires 134 are lifted to strip the surface finish and thereby reveal the location of the fasteners hidden below.

In FIG. 7 the panel structures are the same as in FIGS. 8 and 9 and the insert and seal structure in FIG. 7 is substantially the same as that in FIG. 6 except that an inverted tubular cup insert 100A is slightly shorter in height compared to cup 100 in FIG. 6. Instead of the seal 96 being directly supported on a transverse bottom web as 98, the cup bottom 98A in FIG. 7 has a magnetic disc 136 thereon so as to directly support the seal 96. In the embodiment shown in FIG. 7, a magnetic disk is positioned above each fastener to index the locations thereof through use of a magnetic stud-finder when panel removal or fastener access is required.

FIG. 10 illustrates an embodiment of the panel 10 having upper plate 12 and lower plate 14 in which a generally cylindrical opening has been drilled through the panel so that it could receive an upwardly open generally tubular first cup insert, generally designated as 140. The cup has a relatively thick generally cylindrical bottom portion 142 from which extends a radially directed flange 144. The flange 144 is bonded and sealed to the external side of the plate 14 and the bottom portion 142 has a cylindrical opening through which it receives a standardized CSK fastener 146. The fastener is supported in the cup by a hard washer 148 having a conical upper surface complementary to the head of the bolt. The cup 140 has a cylindrical sidewall 150 which is bonded along its external vertical side to elements of the honeycomb. The upper end of the wall 150 is swaged at 152 over the plate 12 and bonded thereto.

A second inverted generally tubular cup 160 has a bottom or platform 162 spaced above the nut head and extending transversely across the first cup 140. A cylindrical wall 164 of the cup 160 extends downwardly and is supported by the bottom portion 142 of the cup 140. A hardened silicone rubber seal as 96A is supported on the transverse bottom 162 and extends on the cylindrical wall 150 to form a seal across the transverse bottom and to the swaged end 152 extending circumferentially around the seal and the opening in the plate 12. Over the seal is a tape 130, adapted as described, to find the fasteners hidden by the gritted surface finish 132. The clip nut tightens the bolt and secures the panel to the subsurface structure 72 in a sealed relationship.

FIG. 11 illustrates an embodiment, having the same cup 140 and its flange 144 bonded to the lower plate 14 and having its upper edge swaged over the plate 12, as in FIG. 10. A bolt 170 has a slotted head for tightening on a nut, not shown, by means of a straight-bladed screwdriver. Spaced between the bolt head and a hardened high density seal 96B, typically silicone rubber, is a foam support disk 174, typically polyethylene. The disk 174 is crushable and provides space within which the bolt 170 can move without damaging the seal 96B.

FIG. 12 illustrates an embodiment which is similar to that shown in FIG. 4 and which can be used to rework existing panels. Here, a generally cylindrical member 178 has a flange 180 extending radially outwardly and which is bonded to the external surface of the plate 14. Above the flange in the member 178 is an annular groove 182 into which the edge 184 of a circular opening in the plate 14 is engaged. If the plate 14 is sufficiently flexible, it can be snapped into the groove 182. A bolt 170 extends through a central opening in the member 178. Supported on an upper surface 186 of member 178 is a generally spool-shaped sleeve 190. The spool is formed by an annular flange 192 at the lower end on the surface 186 and to which it may be bonded for sealing. Upwardly of the flange 192 is a cylindrical wall 194 and at its upper end is an annular flange 196, having downwardly converging annular side 198 and upwardly converging side 200. Internally of the flange 196, there is an annular shoulder 202, supporting a hardened seal 96C. The seal is also supported by a low density sealant or foam 206 which forms a disk between the hardened seal, the top of the bolt head, and the cylindrical wall of the sleeve. The low density sealant is relatively soft and would permit upward movement of the bolt head, without damage to the hardened seal, in the space between the top of the bolt head to the bottom of the hardened seal 96C. The seal 96C has a vinyl tape extending thereover for finding, and as described above, the panel is covered with a gritted surface finish 132. When plate 14 is rigid an optional opening can be routed in the side of the panel so the cylindrical member 190 can be installed in panel from the side.

In FIG. 13 the panel 10 has inserts in the form of caps or tubular cups of the same general configuration shown in FIG. 6. Here, a first upwardly open tubular cup member 210 is fitted in an opening through the panel and has a sidewall 212 which may be bonded to honeycomb elements within the panel. At the upper end of the wall 212 there is an outwardly directed radial flange 214 bonded to the outer surface of the plate 12 to be in sealing and supported engagement therewith.

An inverted tubular second cap or cup 220, fitted within the upwardly open cup 210, has its lower end 222 supported on the bottom of the cap 210. The web bottom 224 of the cap 220 forms a transverse surface across the cylindrical opening of cup 210 and supports a hardened silicone rubber seal 96D which extends thereacross and in alignment with the flange 214. This seals the top of the fastener which is in the form of a bolt having a head 230, adapted to be tightened with a socket wrench. The bolt extends through a central opening in the bottom of the cup 210 and through a central opening in a third and inverted tubular member or cup, generally designated as 236. The bottom of the inverted member 236 supports the bottom of the cup 230. The member 236 has an annular radially extending flange 240, bonded to the outer surface of the plate 14. A second hardened cylindrical seal 242 is fitted in the cylindrical member 236, and a bolt extends therethrough in a sealing engagement, and similarly, is in sealing engagement with the gasket 68. Here again, the bolt is tightened on a clip nut 76 from above. The top of the head of the bolt 230 is spaced from the transverse web 224 to permit vertical movement of the bolt without damage to the seal.

In FIG. 14 a generally cylindrical opening has been cut through the plates 12 and 14 and the honeycomb therebetween to receive a first and lower cup, generally designated as 250, and formed of two threadedly engaged sleeves 252 and 254. The lower member 254 has a radially extending flange 256, bonded to the external surface of the plate 14 and has a cylindrical wall 258 extending upwardly and having external threads. Within wall 258 there is a bottom portion 260 having an opening to receive a bolt having a head 264 adapted to be tightened by the socket wrench.

The upper sleeve 252 has an upper radially extending flange 272 and a lower radially extending flange 274. In this concept sleeve 252 must be installed in panel 10 from the side through a routed slot in the panel core. The sleeve 252 adjacent its lower end has internal threads 276 which are engaged with the external threads of the cup part 254. The flanges 272 and 274 are bonded to the adjacent panel plates.

At the upper end of the sleeve 252 there are internal threads 280 in which a second cup 282 is threadedly engaged. The second cup has a transverse bottom or web 284 spaced above the bolt head 264 so as to provide room for relative vertical movement of the bolt without damage to a hardened seal 290 which fills the cup 282 and extends radially over the top thereof to form a seal along the opening in the plate 12.

In this arrangement a nut plate 294 is secured to the substructure 72 by rivets 296 so that the bolt can be tightened therein from above while the nut is held securely by the rivets.

In FIG. 15 a lower upwardly opening first cup 300 is formed in the same manner from two parts as the cup 250 in FIG. 14. The lower part has a radial flange 302 and an upwardly extending wall 304 having external threads. A second sleeve 306 has a lower radial flange 308 and upwardly therefrom has internal threads which are engaged with the external threads of the wall 304. The flanges 302 and 308 are bonded to the lower plate 14.

The upper end of the sleeve 306 has a radially directed flange 310 bonded to the internal surface of the upper plate 12. The sleeve 306 is fitted into the panel in the same manner as the sleeve 250 in FIG. 14.

Internally the upper end of the sleeve 306 has a slightly conical surface at 312 to receive a second upper cup 314 having an outer cylindrical surface. The outer cylindrical surface is hand fit into the conical surface until it becomes tight. A liquid silicone rubber seal 316 is poured into the upwardly open second cup and allowed to flow over its top so as to form a seal against the wall of the sleeve 306 and the edge of the plate 12. The seal hardens as indicated above. This arrangement is very similar to that in FIG. 14 and permits space between the bottom of the cup 314 and the top of the head of the bolt 264.

The embodiment in FIG. 16 is one similar in part to that in FIG. 4, made from a prior art insert, and also similar to that shown in FIG. 14. In FIG. 16 the lower cup is formed of a generally cylindrical member 320 having an annular groove 322. Extending downwardly and radially outwardly from the groove is a flange 324 bonded to the lower surface 14 of the panel. An inner circular surface around the opening in the panel 14 is engaged and bonded in the groove 322. This, as indicated above, may be a snap fit or the insert can be inserted from a side cut routed in the panel core. A central bottom portion 326 of the member 320 has an opening for the bolt and surrounding the bolt is a support washer 328 having an upper conical surface to accommodate a conical surface on a Phillips head, standardized countersunk fastener 330. Extending upwardly from the member 320 is a cylindrical sidewall 332 having internal threads adjacent its upper end and having a radially outwardly directed flange 334 at its upper end. The flange 334 is bonded to the underside of the plate 12.

Threadedly engaged in the upper end of the wall 332 is an upwardly open second cup 336 having external threads engaged with the internal threads of the wall 332. Here again, a seal 340 is formed in the upwardly open cup and extends over the top of the cup to form a seal along the inner cut surface of the upper plate 12. Again, there is a substantial space between the top of the bolt and the lower surface of the transverse bottom of the upper cup to permit upward movement of the bolt.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. A fastener assembly for floor panels which permits floor panel removal and inspection from above, comprising:

an upwardly open first cup;

said first cup having a central hole in its bottom and having a fastening bolt extending therethrough;

an upper second cup fitted in the opening of the upwardly open first cup;

the upper second cup having a central portion forming a wall transverse to the bolt axis and spaced above on the bolt head; and a hardened seal extending across and above said transverse wall of said upper cup and forming a seal across the opening of the upwardly open first cup.

2. The invention according to claim 1 in which:

said second cup has its opening extending downwardly within the first cup and is supported on the bottom of the first cup.

3. The invention according to claim 2 in which:

a magnetic disk extends between said transverse wall and said seal.

4. The invention according to claim 2 in which:

said first cup has a flange extending radially outwardly from the upper end thereof and from the seal;

a generally cylindrical member having an upper surface in supportive contact with a lower external surface of the bottom of the first cup;

said cylindrical member having an annular flange extending radially outwardly from a lower surface and having a central hole to receive the bolt.

5. The invention according to claim 2 in which:

said first cup has a flange extending radially outwardly from the upper end thereof and from the seal;

a third cup open downwardly and having an upper external bottom surface in supportive contact with a lower external surface of the bottom of the first cup;

said third cup having an annular flange extending radially outwardly from its lower end;

the third cup bottom having a central hole to receive the bolt;

a seal in said third cup having a central hole to receive the bolt in a sealing relationship.

6. The invention according to claim 5 in which:

there is a supporting washer between the internal bottom of the first cup and the head of the bolt.

7. The invention according to claim 1 in which:

said second cup opens upwardly and said transverse wall forms the bottom of the second cup;

said seal filling said second cup and extending over the opening of the second cup to form said seal with the first cup.

8. The invention according to claim 7 in which:

said first cup is formed of an upper and lower part;

said lower part having a radially outwardly extending flange at its lower end, and having an externally threaded tubular wall extending upwardly from the last flange;

said upper part being generally spool-shaped having radially outwardly extending flanges at upper and lower ends;

said upper part having internal threads extending upwardly from its lower end, said lower and upper parts being threadedly engaged by said last threads so that the lower flange of the upper part is spaced from the flange at the lower end of the lower part to receive a panel lower plate between the last flanges;

said second cup having external threads fitted with internal threads of the upper part of the first cup in said opening.

9. The invention according to claim 7 in which:

said first cup is formed of an upper and lower part;

said lower part having a radially outwardly extending flange at its lower end, and having an externally threaded tubular wall extending upwardly from the last flange;

said upper part being generally spool-shaped having radially outwardly extending flanges at upper and lower ends;

said upper part having internal threads extending upwardly from its lower end, said upper and lower parts being threadedly engaged by said last threads so that the lower flange of the upper part is spaced from the flange at the lower end of the lower part to receive a panel lower plate between the last flanges;

the opening of the upwardly open first cup at its upper end being slightly conical; and the second cup having an outer generally cylindrical surface to be hand-fitted in the first cup.

10. The invention according to claim 7 in which:

said first cup has a radially outwardly extending flange at its upper end and has a generally cylindrical member adjacent its lower end;

said first cup having a radially outwardly extending flange at its lower end;

an annular groove in said generally cylindrical member immediately above said last flange to receive a lower plate of a panel;

said upper end of said first cup having internal threads and said second cup having external threads fitted with said internal threads of the first cup in said opening.

11. The invention according to claim 1 in which:

the space between bolt head and the transverse wall permit relative vertical movement of the bolt head with respect to the transverse wall.

12. A fastener assembly for floor panels which permits floor panel removal from above, comprising:

a tubular member having a central opening having a bolt extending therethrough;

means for supporting said tubular member and the bolt head adjacent the lower end of the tubular member;

a low density sealant extending over the bolt head across the tubular member and spaced below the upper end of tubular member;

a hardened high density seal extending across the low density sealant and forming a seal at the upper end of the tubular member; and means adjacent the upper end of the tubular member to provide additional support for the high density seal;

the low density seal being adapted to permit relative vertical movement of the bolt without damage to the high density seal.

13. The invention according to claim 12 in which:

said means for supporting the bolt head adjacent the lower end of the tubular member is a radially inwardly directed tube bottom having said central opening therein; and said means for supporting the tubular member adjacent its lower end is a radially outwardly directed flange adapted to be secured adjacent the lower side of a panel.

14. The invention according to claim 12 in which:

said means for supporting the tubular member and bolt head is an annular insert adapted to be secured to a lower side of a panel, the insert having a hole to receive the bolt;

the insert having upper and lower annular projections extending radially outwardly, the upper projections being adapted to engage a lower side of the panel internally and the lower projection being a flange adapted to be secured to lower side of the panel externally.

15. A waterproof floor panel fastening system, accessible from above, comprising:

floor panels having spaced upper and lower plates, supporting means between and secured to the upper and lower plates;

said panels being waterproof and being secured on support structure thereunder;

fastening assemblies securing the panels to the support structure and extending into openings through the upper and lower plates and the supporting means therebetween;

each assembly having an upwardly open first cup;

said first cup having a central hole in its bottom and having a fastening bolt extending therethrough;

an upper second cup fitted in the opening of the upwardly open first cup;

the upper second cup having a central portion forming a wall transverse to the bolt axis and spaced above the bolt head; and a hardened seal extending across and above said transverse wall of said upper cup and forming a seal across the opening of the upwardly open first cup.

16. The invention according to claim 15 in which:

said second cup opens downwardly and has a side wall within the first cup extending downwardly from the central portion and has an opening at a lower end of the sidewall, said sidewall being supported on the bottom of the first cup so as to support the second cup.

17. The invention according to claim 16 in which:

a magnetic disk extends between said transverse wall and said seal.

18. The invention according to claim 16 in which:

said first cup has a flange extending radially outwardly from the upper end thereof and from the seal; said first cup flange being in sealing relationship with said upper plate;

a generally cylindrical member having an upper surface in supportive contact with a lower external surface of the bottom of the first cup;

said cylindrical member having an annular flange extending radially outwardly from a lower surface and having a central hole to receive the bolt; said cylindrical member flange being in sealing relationship with said lower plate.

19. The invention according to claim 18 including:

a supporting washer between the internal bottom of the first cup and the head of the bolt.

20. The invention according to claim 18 in which:

said first cup flange is externally of and above said upper plate and said cylindrical member flange is externally of and below said lower plate;

a float gasket forming a seal between the support structure and the cylindrical member and its flange;

said bolt extending through the gasket and support structure;

a nut on said bolt below said support structure to tighten the first cup flange, the upper and lower plates, the first cup, the cylindrical member, and the gasket to the support structure.

21. The invention according to claim 20 in which:

said floor panels are spaced horizontally as secured to said support structure;

a hardened seal filling horizontal space between said panels, and wire seal-strippers buried in said last seal to facilitate panel removal.

22. The invention according to claim 16 in which:

said first cup has a flange extending radially outwardly from the upper end thereof and from the seal; said first cup flange being in sealed relationship with said upper plate;

a third cup open downwardly and having an upper external bottom surface in supportive contact with a lower external surface of the bottom of the first cup;

said third cup having an annular flange extending radially outwardly from its lower end;

said third cup flange being in sealed relationship with said lower plate;

the third cup bottom having a central hole through which the bolt extends; and a seal in said third cup having a central hole receiving the bolt in a sealing relationship.

23. The invention according to claim 22 in which:

there is a supporting washer between the internal bottom of the first cup and the head of the bolt.

24. The invention according to claim 23 including:

a float gasket between the lower plate and the support structure;

said bolt extending through the gasket and the support structure;

the seal in the third cup being in sealing relationship with the gasket;

said first cup flange being externally of said upper plate and a nut on said bolt below said support structure to tighten the first cup flange, the upper and lower plates, the gasket, and the first and third cups to the support structure.

25. The invention according to claim 24 in which:

said floor panels are spaced horizontally as secured to said support structure;

a hardened seal filling horizontal space between said panels, and wire seal-strippers buried in said last seal to facilitate panel removal.

26. The invention according to claim 15 in which:

said second cup opens upwardly and said transverse wall forms the bottom of the second cup;

said seal filling said second cup and extending over the opening of the second cup to form said seal with the first cup.

27. The invention according to claim 26 in which:

said first cup is formed of an upper and lower part;

said lower part having a radially outwardly extending flange at its lower end, and having an externally threaded tubular wall extending upwardly from the last flange; said flange on said lower part being bonded to an external side of a lower plate;

said upper part being generally spool-shaped having radially outwardly extending flanges at upper and lower ends;

said flange at said upper end of said upper part being bonded to an internal side of an upper plate;

said upper part having internal threads extending upwardly from its lower end, said lower and upper parts being threadedly engaged by said last threads so that the lower flange of the upper part is spaced from the lower end of the lower part to engage and be bonded to an internal side of a lower plate of the panel;

said second cup having external threads fitted with internal threads of the upper part of the first cup in said opening.

28. The invention according to claim 26 in which:

said first cup is formed of an upper and lower part;

said lower part having a radially outwardly extending flange at its lower end, and having an externally threaded tubular wall extending upwardly from the last flange; said flange on said lower part being bonded to an external side of a lower plate;

said upper plate being generally spool-shaped having radially outwardly extending flanges at upper and lower ends;

said upper part having internal threads extending upwardly from its lower end, said upper and lower parts being threadedly engaged by said last threads so that the lower flange of the upper part is spaced from the lower end of the lower part to engage and be bonded to an internal side of a lower plate of a panel;

the opening of the upwardly open first cup at its upper end being slightly conical; and the second cup having an outer generally cylindrical surface hand-fitted in the first cup.

29. The invention according to claim 26 in which:

said first cup has a radially outwardly extending flange at its upper end and has a generally cylindrical member adjacent its lower end;

said first cup flange at its upper end being bonded to an internal side of an upper plate;

said first cup having a radially outwardly extending flange at its lower end;

an annular groove in said generally cylindrical member immediately above said last flange, said groove being engaged with a circular edge of an opennng in a lower plate;

said last flange being bonded to the external side of the lower plate;

said upper end of said first cup having internal threads and said second cup having external threads fitted with said internal threads of the first cup in its opening.

30. The invention according to claim 15 including:

identifying tapes extending over the upper plates of the panels and over selected fastening assemblies for identification of their locations;

said tapes having ends exposeable at selected portions on panels, said ends being exposeable for grasping and stripping tapes off of panels and assemblies to expose assemblies;

said floor panels being normally covered with a finish surface which is removable above tapes by stripping tape off panels.

31. The invention according to claim 15 including:

a surface finish over the floor panels and fastening assemblies;

magnetic wires extending over the upper plates of the panels and over fastening assemblies for identification of their locations, said wires being within said surface finish;

said wires being locateable by magnetic stud finders and/or knife probes and when located, being adapted to be pulled up through the finish to expose the fastening assemblies.

* * * * *

UNITED STATES PATENT AND TRADEMARK OFFICE
CERTIFICATE OF CORRECTION

PATENT NO. : 4,577,450
DATED : March 25, 1986
INVENTOR(S) : David T. Large

It is certified that error appears in the above-identified patent and that said Letters Patent are hereby corrected as shown below:

Claim 28, column 14, line 61, "plate" should be
-- part --.

Claim 29, column 15, 6th line from the bottom,
"openng" should be -- opening --.

Signed and Sealed this

Nineteenth Day of August 1986

[SEAL]

Attest:

Attesting Officer

DONALD J. QUIGG

Commissioner of Patents and Trademarks